United States Patent [19]
Pedron et al.

[11] Patent Number: 5,975,692
[45] Date of Patent: Nov. 2, 1999

[54] CONNECTING DEVICE FOR TINTED LENSES ON CORRECTIVE EYEGLASSES

[75] Inventors: Michele Pedron, S. Stino Di Livenza; Sergio Menegon, Montebelluna, both of Italy

[73] Assignee: United Optical S.p.A., S. Stino di Livenza, Italy

[21] Appl. No.: 09/287,120

[22] Filed: Apr. 7, 1999

[30] Foreign Application Priority Data

Apr. 15, 1998 [IT] Italy .................................. TV98A0055

[51] Int. Cl.⁶ ........................................................ G02C 9/00
[52] U.S. Cl. ............................................. 351/47; 351/140
[58] Field of Search .................... 351/47, 48, 57, 351/58, 140

[56] References Cited

U.S. PATENT DOCUMENTS 5,841,506   11/1998   Karasawa et al. ........................ 851/47

*Primary Examiner*—Huy Mai
*Attorney, Agent, or Firm*—Guido Modiano; Albert Josif; Daniel J. O'Byrne

[57] ABSTRACT

A device for connecting monolithic tinted lenses on a bridge of a pair of corrective eyeglasses, consisting of a first body which has first and second elements for temporary engagement at at least one seat formed on the lens and to the bridge. A second body is also provided which allows to temporarily lock the position of the first body on the lens.

14 Claims, 3 Drawing Sheets

CONNECTING DEVICE FOR TINTED LENSES ON CORRECTIVE EYEGLASSES

BACKGROUND OF THE INVENTION

The present invention relates to a connecting device which can be used in the field of eyeglasses.

Wearers of corrective eyeglasses strongly feel the need to be able to wear the eyeglasses even in particularly sunny conditions which require the use of tinted protective lenses.

In this regard, it is known for example to produce skiing goggles which are constituted by a frame with which a tinted single lens is associable; such frame has, at the region between the eyes, a vertical bridge which constitutes an engagement means for a front piece which has no temples; corrective lenses are applied to the front piece and two flexible tabs are associated at its horizontal bridge and are suitable to engage by snap action at the vertical bridge provided in the frame.

This solution is not ideal, since on the one hand it can be used only for a particular sport and on the other hand it requires the user to separately purchase additional eyeglasses with the appropriate corrective lenses.

As a partial solution to this drawback, a tinted lens is conventionally used which is formed monolithically and with which an element for connection to the bridge of corrective eyeglasses is associated at the region between the eyes; the connection element is substantially constituted by a plate which is associated with the lens and is in turn transversely pivoted at a pair of tabs which can be spaced elastically and are arranged at right angles to the transverse bridge of the eyeglasses; mutual connection occurs by inserting from above the transverse bridge of the corrective eyeglasses between the tabs.

However, this solution entails drawbacks, since if the user no longer wishes to use the tinted lens he must overturn it with respect to the front surface of the corrective eyeglasses, since any removal of the bridge necessarily entails removing the eyeglasses, gripping them with one hand and extracting the tabs from the bridge, taking care to avoid scraping said bridge.

Keeping the tinted lens raised with respect to the frame of the corrective eyeglasses has drawbacks, since the lens can accidentally make contact with other elements near the user and therefore suffer possible breakage or transmit impacts to the frame and accordingly to the head of the user.

SUMMARY OF THE INVENTION

The aim of the present invention is to solve the mentioned problems, eliminating the drawbacks of the cited prior art and thus providing a device which allows easy and quick connection of a tinted lens to corrective eyeglasses.

Within the scope of this aim, an object of the invention is to provide a device which allows the user to just as quickly and easily use the tinted lens without said lens protruding or causing accidental impacts with other bodies.

Another object of the present invention is to provide a device which allows to use one's own corrective eyeglasses without subjecting them to wear or breakage for connection and disconnection of the tinted lens.

Another object of the invention is to provide a device which is structurally simple and can be used by the user even with just one hand and can therefore be used even in sports.

A further object of the invention is to provide a device which is reliable and safe in use and has low manufacturing costs.

This aim, these objects and others which will become apparent hereinafter are achieved by a connection device, particularly for monolithic tinted lenses on a bridge of corrective eyeglasses, which is characterized in that it comprises a first body which has first and second means for temporary engagement at at least one seat formed on said lens and to said bridge, and a second body for temporarily locking the position of said first body on said at least one lens.

BRIEF DESCRIPTION OF THE DRAWINGS

Further characteristics and advantages of the present invention will become apparent from the following detailed description of particular but not exclusive embodiments thereof, illustrated only by way of non-limitative example in the accompanying drawings, wherein.

DESCRIPTION OF THE PREFERRED EMBODIMENTS

Figure 1:
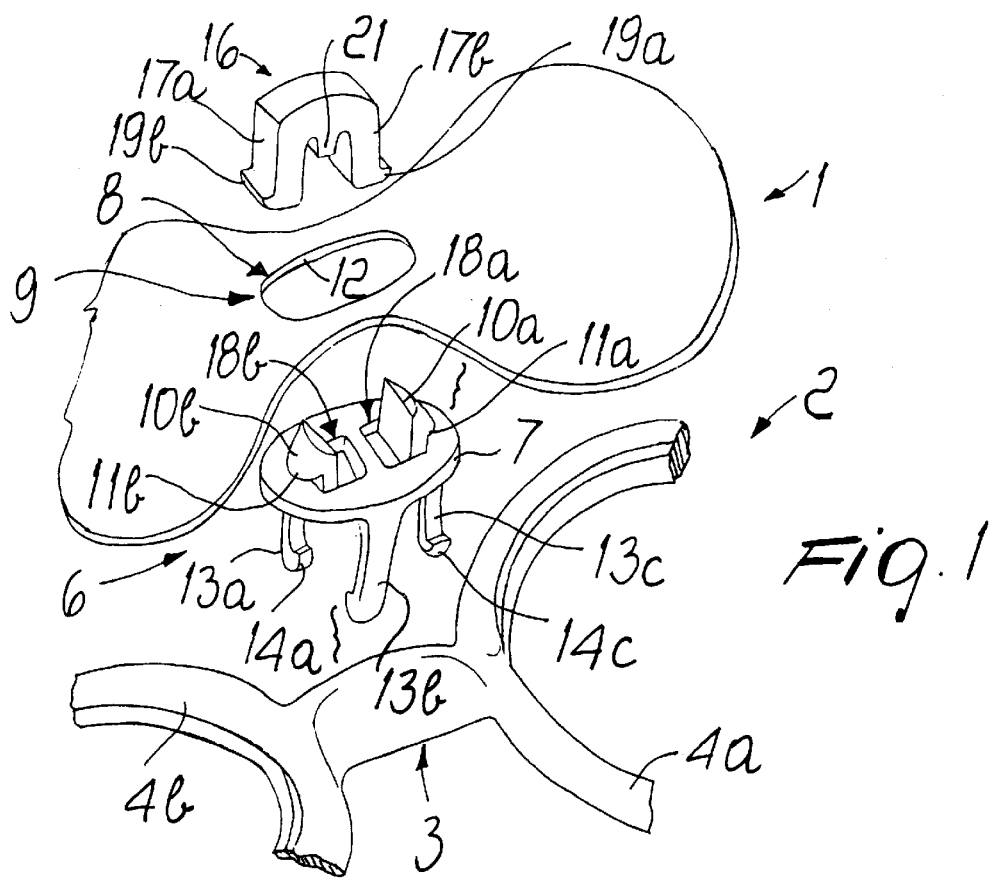
FIG. 1 is an exploded perspective view of the device for connecting the tinted lens to the corrective eyeglasses according to the present invention.
Figure 5:
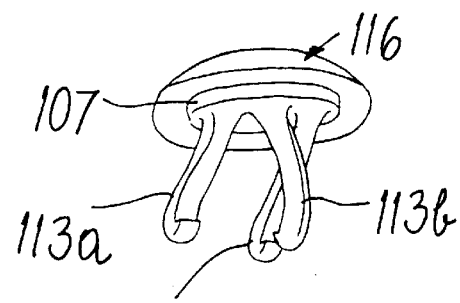
FIG. 5 is a perspective view, similar to FIG. 4, of the device alone.
Figure 4:
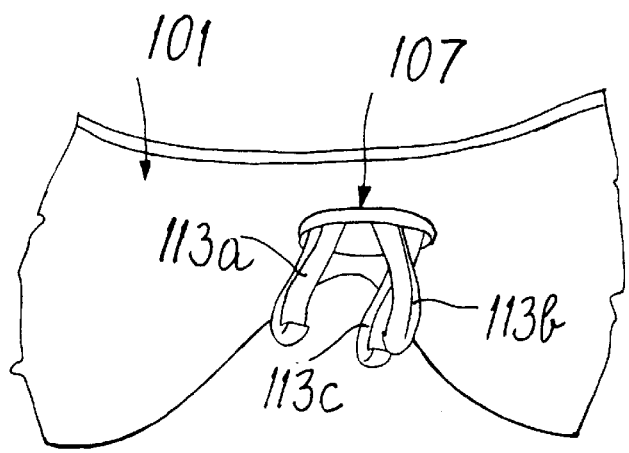
FIG. 4 is a perspective bottom view of a second embodiment of the device associated at the lens.

With reference to the above figures, the reference numeral 1 designates a tinted lens, which is formed monolithically, and the reference numeral 2 designates the front of a pair of corrective eyeglasses which comprises a bridge 3 arranged transversely so as to connect eyewires 4a and 4b on which the seats for the corrective lenses are formed.

The reference numeral 5 instead designates the connection device, which is constituted by a first body 6 which comprises a flat base 7 with which first temporary engagement means are associated; said means are meant to provide temporary engagement at at least one first seat 8 formed preferably transversely to the lens 1 at a region 9 that lies between the eyes.

The first engagement means are constituted by two first tabs 10a and 10b which protrude at right angles and upward from the base 7 and are mirror-symmetrical with respect to a median plane which lies transversely to the base. The first tabs 10a and 10b are flexible and are preferably L-shaped, so as to form first teeth 11a and 11b whose height allows to arrange the edge 12 of the first seat 8 between the teeth and the base 7.

Second means for temporarily coupling to the bridge 3 of the front 2 of the corrective eyeglasses protrude from the base 7 in a downward region, on the opposite side with respect to the first tabs 10a and 10b, and are constituted by second tabs which, in the particular embodiment, are three and are designated by the reference numerals 13a, 13b and 13c.

In the particular embodiment, the second tabs also are L-shaped and at the tip there are second teeth 14a, 14b, 14c which are mutually opposite and are adapted to lock in a vise-like configuration at the lateral surface 15 of the bridge 3 that is directed towards the user's face.

The height of the second tabs 13a, 13b and 13c is of course such as to allow, once the first body 6 has been associated with the bridge 3, the base 7 and the second teeth to adhere to the bridge in an optimum manner.

The connection device 5 also comprises a second body 16 for temporarily locking the position of the first body 6 at the first seat 7 formed in the lens 1. The second body is essentially M-shaped and accordingly has two lateral wings 17a and 17b which can be slidingly arranged at suitable and complementarily shaped second seats 18a and 18b formed in the base 7 adjacent to the region between the first tabs 10a and 10b.

The lateral wings 17a and 17b also are L-shaped, so as to form third teeth 19a and 19b which are suitable to engage at the lower surface 20 of the base 7 that lies below the first tabs 10a and 10b.

The lateral wings 17a and 17b can of course be compressed elastically and the dimensions of the second seats 18a and 18b allow such deformation.

Figure 2:
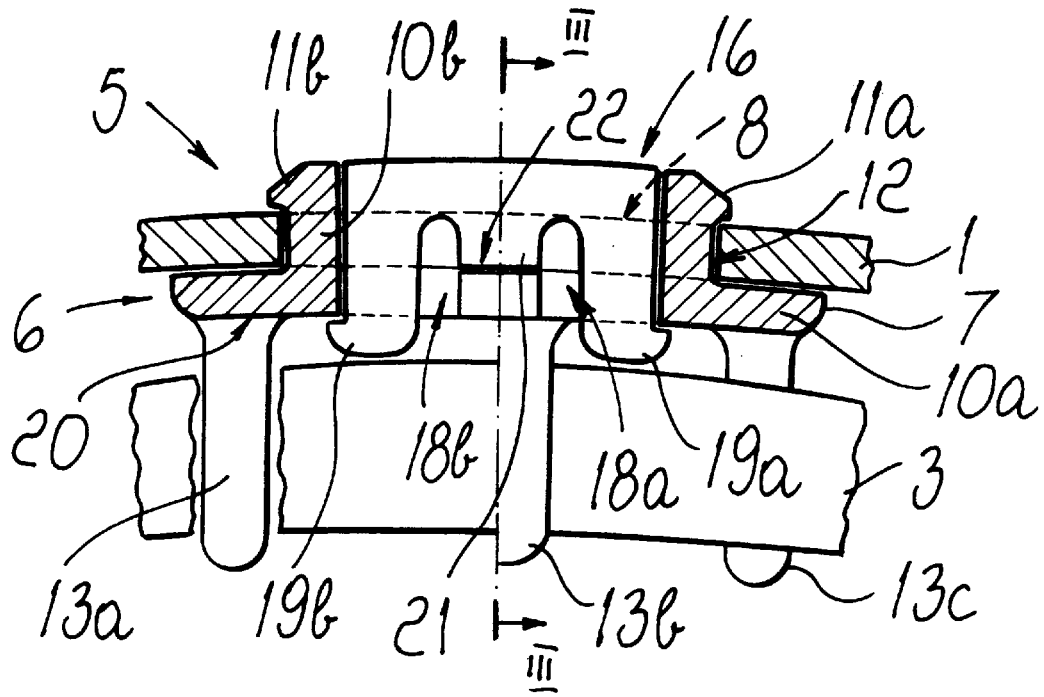
FIG. 2 is a sectional view, taken along a transverse median plane, of the device associated with the tinted lens and with the corrective eyeglasses.
Figure 3:
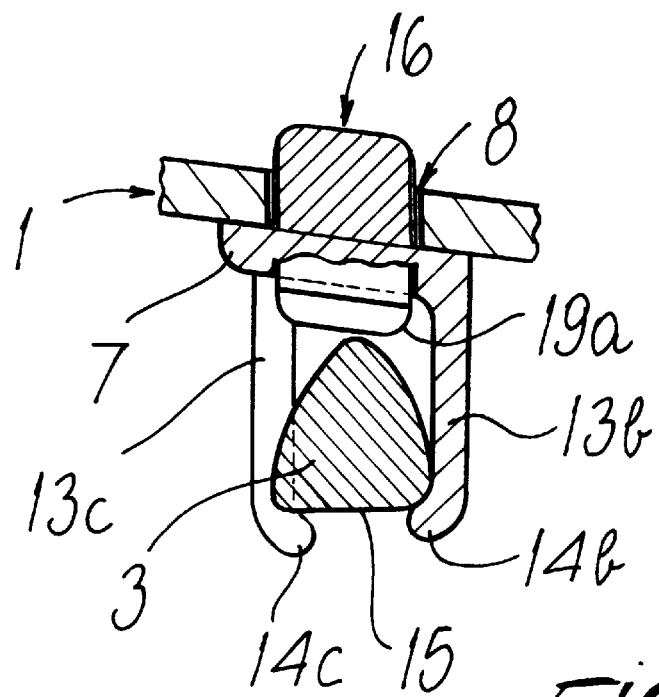
FIG. 3 is a sectional view, taken along the plane III—III of FIG. 2.
Figure 6:
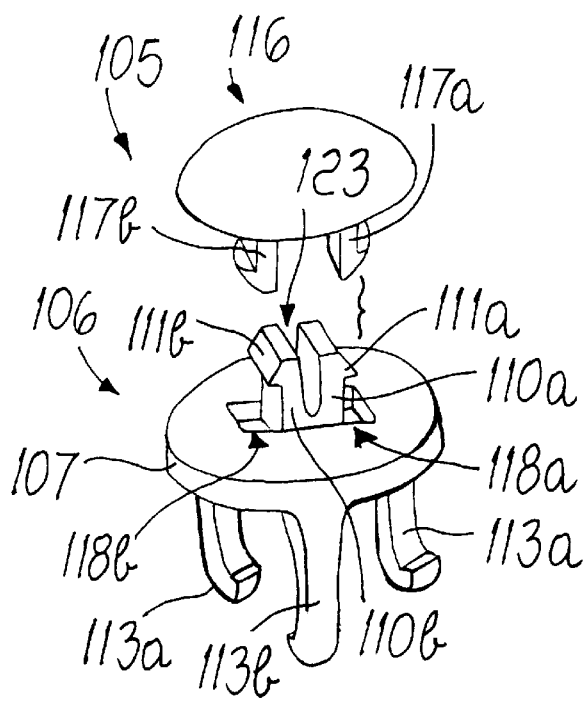
FIGS. 6 and 7 are lateral perspective views of the device of FIG. 5 and of a detail thereof.
Figure 7:
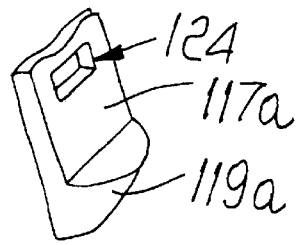

The second body 16 has a central wing 21 whose tip is flat and rests by abutment at the upper surface 22 of the base 7 that is interposed between the second seats 18a and 18b; in this condition, the third teeth 19a and 19b engage the lower surface 20 of said base 7, as shown in FIG. 2.

When using the connection device, the first body 6 is initially associated with the lens 1, forcing the deformation of the first tabs 10a and 10b until the lens 1 rests at the base 7 and mutual locking is thus achieved by means of the snap-together engagement determined by the presence of the first teeth 11a and 11b.

Once this has been done, the second body 16 is associated with the first body 6 by compressing the lateral wings 17a and 17b, inserting them in the second seats 18a and 18b until they engage, by snap action, at the lower surface 20 that lies below the first tabs 10a and 10b.

Temporary locking between the lens 1 and the connection device 5 is thus achieved.

At this point the user merely has to couple the connection device and the corresponding lens associated therewith to the bridge 3 simply by forcing the second tabs 13a, 13b and 13c so as to surround and lock, with a snap action, at said bridge 3.

This operation can be easily performed with just one hand and removal can be performed safely; the lens can be stored just as easily when not in use.

It has thus been observed that the present invention has achieved the intended aim and objects, a device having been provided which allows rapid and easy connection and disconnection of a tinted lens at a pair of corrective eyeglasses, these operations being feasible by the user even with just one hand, therefore allowing to use the tinted lens whenever necessary.

The particular structure of the device allows optimum anchoring and allows to maintain the correct position of the lens 1 with respect to the front 2 even when performing sports such as cycling, in which an air stream generates a localized pressure at such lens.

The easy interconnection also allows to use the device even during any sport, without requiring the user to remove his eyeglasses.

The invention is of course susceptible of numerous modifications and variations, all of which are within the scope of the same inventive concept.

Thus, for example, FIGS. 4, 5, 6 and 7 illustrate a second embodiment of the connection device, now designated by the reference numeral 105, which again comprises a first body 106 which has a base 107 provided with first means for temporary engagement at a first seat formed at a tinted lens 101 obtained monolithically. The first means are constituted by two first tabs 110a and 110b which protrude from the base 107 approximately at a median axis thereof.

The first tabs 110a and 110b can be compressed elastically with respect to each other, since a suitable longitudinal slot 123 is provided between them.

Second tabs 113a, 113b and 113c protrude below the base 107.

Moreover, the connection device 105 comprises a second body 116 which is substantially shaped like a spherical dome and below which two wings 117a and 117b protrude. Such wings are mirror-symmetrical with respect to a median plane which lies diametrically to the second body 116 and are mutually divided so that they can be inserted at suitable second seats 118a and 118b which are formed transversely to the base 107 in a region which is adjacent to the first tabs 110a and 110b.

The wings 117a and 117b have, at their tips, suitable third teeth 119a and 119b which are adapted to engage at the lower surface of the base 107.

Third seats 124 for temporarily engaging the first teeth 111a and 111b are also formed in the wings 117a and 117b.

The height of the first tabs 110a and 110b and of the wings 117a and 117b and the position of the third seats 124 is such as to allow the vise-like clamping of the lens 101 once the first body and the second body have been mutually associated.

This embodiment, too, has achieved the intended aim and objects.

Figure 8:
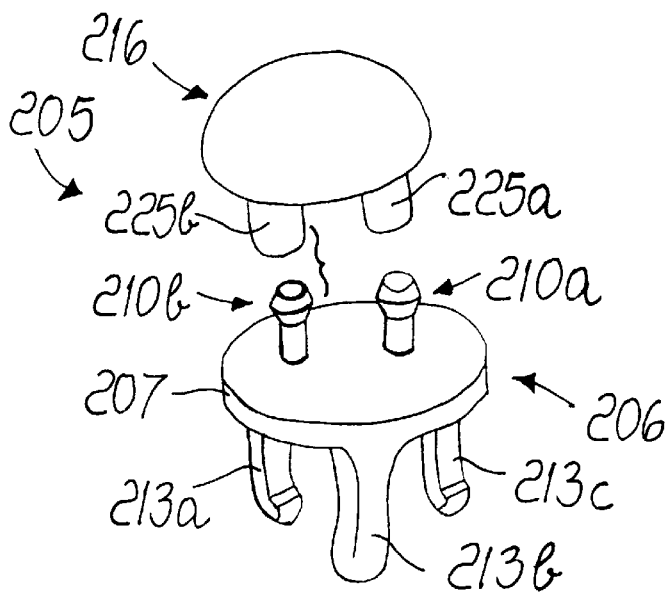
FIGS. 8 and 9 are views, similar to FIGS. 6 and 7, of a third embodiment of the connection device.
Figure 9:
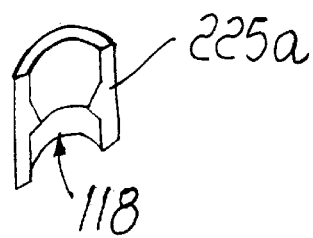

FIGS. 8 and 9 illustrate a third embodiment of a connection device 205, which again comprises a first body 206 which is composed of a base 207 which is provided with first means for temporary engagement to a second body 216, the first means being constituted by a pair of first tabs 210a and 210b which are substantially cylindrical and have a tip which is composed of two mutually opposite cones and is adapted to temporarily engage, with a snap action, at complementarily shaped second seats 118 formed at two sleeves 225a and 225b which protrude below a spherical dome which constitutes the second body 216.

Second means for temporarily engaging the bridge of a front of a pair of corrective eyeglasses again protrude in a downward region from the base 207. The second means are constituted by second tabs 213a, 213b and 213c which engage the bridge with a snap action.

This solution, too, has achieved the intended aim and objects.

The dimensions and the materials that constitute the individual components of the device may of course be the most pertinent according to specific requirements.

The disclosures in Italian Patent Application No. TV98A000055 from which this application claims priority are incorporated herein by reference.

What is claimed is:

1. A connection device for monolithic tinted lenses on a bridge of corrective eyeglasses, comprising a first body which has first and second means for temporary engagement at at least one seat formed on said lens and to said bridge, and a second body for temporarily locking the position of said first body on said at least one seat.

2. The device according to claim 1, wherein said first body comprises a flat base with which said first means are associated for temporary engagement at at least said one first seat, said seat being formed transversely to said lens at a region between the eyes.

3. The device according to claim 2, wherein said first means are constituted by two first tabs which protrude at right angles to said base and above it and are mirror-symmetrical with respect to a median plane which lies transversely to said base.

4. The device according to claim 3, wherein said two first tabs are flexible and are L-shaped so as to form first teeth whose height allows to position an edge of said first seat between said teeth and said base.

5. The device according to claim 4, wherein said first means are constituted by two first tabs which protrude from said base approximately at a median axis thereof, said first tabs being elastically mutually compressible by means of the presence of a longitudinal slot between them.

6. The device according to claim 5, wherein said second body is shaped like a spherical dome below which two wings protrude which are mirror-symmetrical with respect to a median plane which is diametrical with respect to said second body, said wings being mutually split so that they can be inserted at second seats formed transversely to said base in a region which is adjacent to said first tabs.

7. The device according to claim 6, wherein seats for temporary engagement of said first teeth are formed in said wings, the height of said first tabs and of said wings and the location of said third seats being such as to allow a vise-like fastening of said lens once said first and second bodies have been mutually associated.

8. The device according to claim 3, wherein said second means for temporary engagement with said bridge of the front of corrective eyeglasses protrude from said base in a downward region on the opposite side with respect to said two first tabs, said second means being constituted by second tabs.

9. The device according to claim 8, wherein said second tabs are three and are L-shaped, second teeth being provided at tips thereof, said teeth being mutually opposite and being suitable to lock in a vise-like manner at a lateral surface of said bridge that is directed towards the user's face.

10. The device according to claim 9, wherein the height of said second tabs is such as to allow, once said first body has been associated with said bridge, the adhesion of said base and of said second teeth to said bridge.

11. The device according to claim 3, wherein said second body is M-shaped, so as to form two lateral wings which are slidingly arranged at suitable and complementarily shaped second seats formed in said base adjacent to said first tabs and in a region between them.

12. The device according to claim 11, wherein said lateral wings are L-shaped so as to form third teeth which are adapted to engage at a lower surface of said base that lies below said first tabs, the dimensions of said second seats being such as to allow a deformation of said lateral wings.

13. The device according to claim 12, wherein said second body has a central wing the tip of which is flat and rests by abutment at an upper surface of said base interposed between said second seats, said third teeth, in said condition, engaging the lower surface of said base.

14. The device according to claim 1, wherein said first engagement means are constituted by two first tabs which are cylindrical and have a tip which is composed of two mutually opposite cones and is suitable to temporarily engage, with a snap action, at complementarily shaped seats formed at two sleeves which protrude downward from a spherical dome which constitutes said second body.

\* \* \* \* \*